United States Patent [19]

Harrow

[11] Patent Number: 4,461,411
[45] Date of Patent: Jul. 24, 1984

[54] CAMERA CARRYING HARNESSES

[75] Inventor: Nettie P. Harrow, Carmel Valley, Calif.

[73] Assignee: Peña Productions, Inc., Carmel Valley, Calif.

[21] Appl. No.: 518,117

[22] Filed: Jul. 28, 1983

[51] Int. Cl.³ .............................................. A45F 5/00
[52] U.S. Cl. ................................... 224/208; 224/214; 224/215; 224/258; 224/908
[58] Field of Search ............... 224/259, 258, 208, 214, 224/215, 908, 909

[56] References Cited

U.S. PATENT DOCUMENTS

| | | | |
|---|---|---|---|
| 3,884,403 | 5/1975 | Brewer | 224/908 X |
| 4,058,242 | 11/1975 | Brewer | 224/908 X |
| 4,168,022 | 9/1979 | Brewer | 224/908 X |
| 4,232,808 | 11/1980 | Gray | 224/909 X |
| 4,320,863 | 3/1982 | Lyer et al. | 224/259 |
| 4,416,405 | 11/1983 | Caillouet | 224/208 X |

Primary Examiner—Steven M. Pollard

[57] ABSTRACT

A wearer adjustable and camera adjustable camera carrying harness assembly adapted to releasably position a camera firmly against the abdominal area of the wearer when in a carrying position and permitting selective eye level positioning in an operating position comprising an adjustable neck strap connected to conventional coupling elements of a camera and also releasably and adjustably connected to two harness straps which in turn are connected to an adjustable and releasable belt. A camera cradle is adjustably and releasably connected to the belt and secures the camera to the belt by encircling the camera body and camera lens. A camera cover is attached to the belt and can be wrapped around the camera body and lens and fastened to itself to further secure the camera.

9 Claims, 11 Drawing Figures

CAMERA CARRYING HARNESSES

BACKGROUND OF THE INVENTION

Still Cameras are almost exclusively carried by people around their necks in order to serve the dual purposes of (1) having the camera available for immediate use or operation by allowing it to be elevated quickly and easily to the head or eye level of the bearer, and (2) protecting the camera from accidental damage through striking or dropping the camera.

The problems associated with such a method of carrying still cameras include, but are not limited to (1) neck discomfort arising from the camera's weight, and (2) the uncontrolled movement of the camera side to side and away from the bearer's body, making it very difficult to safely and conveniently carry it during various sporting activities such as running, biking, hiking, skiing, or backpacking, to name but a few.

The problems of hanging relatively heavy articles about the bearer's neck by a single strap have resulted in various harness arrangements being configured, but they are relatively expensive, difficult to manufacture, and have not found ready acceptance in the marketplace. Other harnesses require modifications in the articles being carried; the addition of specialized brackets or the drilling of holes into the camera cases themselves. Other harnesses are constructed in such a manner that they do not hold the article firmly to the bearer during vigorous activity, causing annoyance by striking against the body of the bearer or by pulling on the bearer's neck from side to side.

Attempts to solve such problems can be found in devices covered by U.S. Pat. Nos. 3,884,403, 4,058,242, 4,168,022, and 4,320,863.

U.S. Pat. No. 3,884,403 covers an Article Carrying Strap which requires that the article being carried have a fastening means attached to the back of the article and the fastener was subject to accidental disconnection during vigorous activity. Also, owners of expensive cameras objected to permanently affixing any connector to the camera case.

U.S. Pat. No. 4,058,242 attempted to solve the problems of the aforementioned U.S. Pat. No. 3,884,403 by introducing a releasable connector which could be attached to the bottom of the camera by screwing it into the tripod hole of the camera.

U.S. Pat. No. 4,168,022 further attempted to solve such problems by means of encircling the lens of the camera with the waist strap itself or a rope integrated into the waist strap.

U.S. Pat. No. 4,320,863 further attempted to solve such problems by including a backstrap attached to the rear of the waist belt thereby reducing neck fatigue and by introducing a means of attaching the camera to the waist belt using hook or eye fastening material having the trademark Velcro R and by metal rings.

The aforementioned patented devices do not resolve three significant problems. First, the article being carried cannot be removed from the Carrier without destroying the integrity of the Carrier. In other words, the Carrier or Harness does not remain firmly and securely in place on or around the body of the bearer if and when the camera is removed from it. In fact, U.S. Pat. No. 4,320,863 appears to require that the camera be permanently affixed to the harness by use of rings designated 18 and 20 in FIGS. 1 and 2.

Second, the straps which in all cases go around the back and/or under the arms are located precisely where the majority of backpack straps must go. Therefore, irritation and discomfort is likely to arise when carrying most types of backpack, baby carrier, etc. for any length of time while wearing the harnesses. Third, each item (other than U.S. Pat. No. 4,168,022) involves the attachment of some additional device or modification to the camera itself which may interfere with the storage of the camera in its case, since most camera cases are designed to fit snugly around the camera.

SUMMARY OF THE INVENTION

The intent of this invention is to provide a WEARER ADJUSTABLE CAMERA CARRYING HARNESS ASSEMBLY that can safely and comfortably carry a 35 mm still camera for long periods of time and protect it from the elements.

One object of the present invention is to provide a camera carrying harness which holds the camera firmly against the abdominal area of the bearer, yet allows the camera to be quickly and easily raised to head or eye level of the bearer.

Another object of the present invention is to provide a camera carrying harness which allows the camera to be quickly and easily placed on the harness and removed entirely from the harness while the harness itself remains intact and fully and integrally connected about the body of the bearer without any additional items or devices being attached to the camera itself when it is removed from the harness or any modifications whatsoever being made to the camera.

Still another object of the present invention is to provide a camera carrying harness which distributes the camera's weight between the neck and the waist of the bearer to reduce neck fatigue.

Still another object of the present invention is to provide a camera carrying harness which is fully adjustable to bearers of any size.

Still another object of the present invention is to provide a camera carrying harness which can be partially disconnected so as to double as a simple camera neck strap while the harness components themselves remain intact about the bearer's body and can be quickly and easily reconnected, without ever completely removing the camera from the harness.

Still another object of the present invention is to provide a camera carrying harness which is fully compatible and complementary to the wearing of backpacks, baby carriers and other items carried on the bearer's back without irritation or discomfort to the bearer.

Still another object of the present invention is to provide a camera carrying harness which allows freedom of movement to allow all manner of vigorous outdoor sports activities, including but not limited to running, biking, hiking, skiing or backpacking.

Still another object of the present invention is to provide a camera carrying harness which includes an attached camera cover which may be used to further secure the camera to the harness and to protect the camera from rain, snow, wind or other of the elements, and which cover is quickly and easily stored as part of the harness assembly.

Still another object of the present invention is to provide a camera carrying harness which can be inexpensively constructed, is long lasting, will safely carry expensive cameras with a minimum of discomfort to the bearer and will allow a maximum flexibility of use of the camera.

Still another object of the present invention is to provide a camera carrying harness which stabilizes the camera against the bearer in a horizontal and secure position by means of an adjustable and removable fastener around the lens of the camera which will not damage either the lens or camera body.

Other objects and details of the invention will be apparent from the following description, when read in connection with the accompanying diagrams.

DESCRIPTION OF THE PREFERRED EMBODIMENTS OF THE INVENTION

Figure 3:
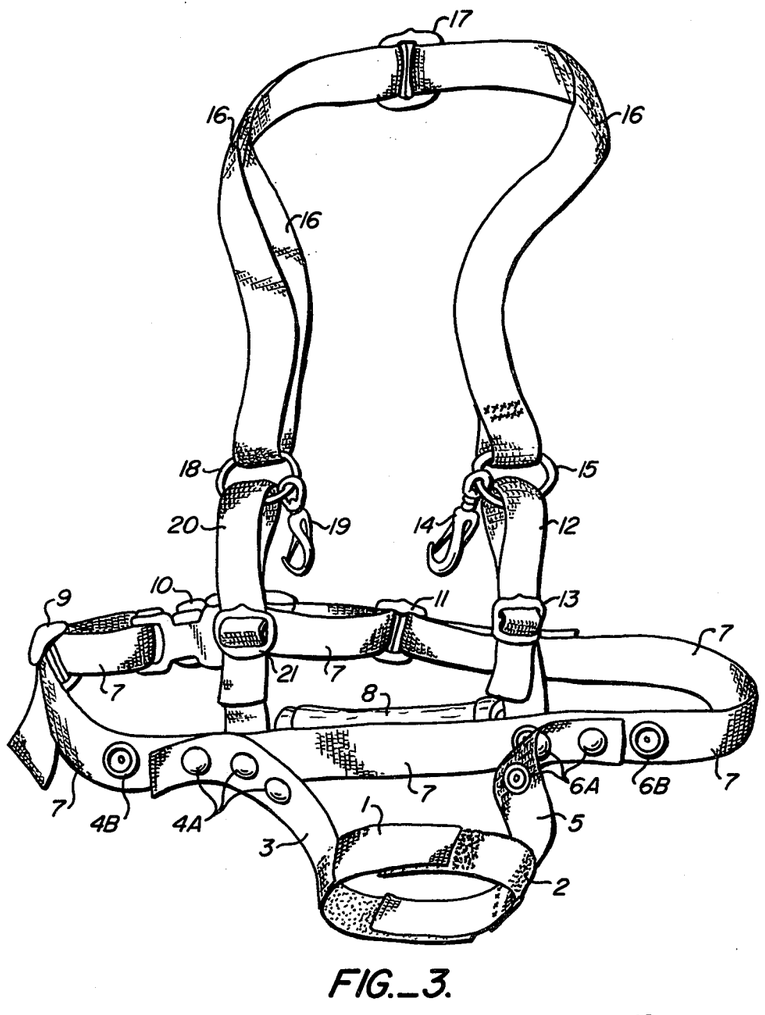
FIG. 3 is a front view of the present invention.

This invention consists of five principal areas or segments which are all shown in FIG. 3. They are first, the neck strap, parts 14, 15, 16, 17, 18, and 19, second, the harness straps, parts 12, 13, 20, 21, third, the belt, parts 7, 9, 10, 11, 4B, and 6B, fourth, the camera cradle, parts 1, 2, 3, 4A, 5, and 6A, and fifth, the camera cover, parts 8, 8A, 8B, 8C, 8D, 8E, and 8F.

Referring to FIG. 3, the neck strap 16 can be one to two inches wide up to forty five inches long, preferably made of nylon webbing; it is sewn around the metal D ring 15. The ¼ inch metal snap hook 14 connects to the metal D ring 15 by its round eye swivel area. The strap 16 is put through the buckle 17, is then brought through the D ring 18 and the end of the strap 16 is returned to the buckle 17 and is sewn around the buckle 17 and to itself. The strap 16 is therefore adjustable to the wearer's own measurements. The ¼ inch metal snap hook 19 connects to the D ring 18 by its round eye swivel area.

Referring to FIG. 3, the harness straps 12 and 20, preferably made of nylon webbing, can be from one to two inches wide and nine inches long. The harness straps 12 and 20 are sewn at one end to the belt 7 and are spaced five inches apart. Strap 12 is looped through the D ring 15 and then through the buckle 13. Strap 20 is looped through the D ring 18 and then through the buckle 21.

Referring to FIG. 3, the belt 7 can be one to two inches wide, at least 25 inches long and up to any desired length sufficient to fit around a person's body near his waistline. For this design the preferred material is nylon webbing. The belt 7 is one long piece of material. The posts and studs 4B and 6B, made preferably of heavy duty jacket type metal snaps are fastened to the belt 7. The end of the belt 7 that fits on the right side of the wearer goes through the buckle 9 and then loops around the side release buckle 10 and back through the buckle 9. The other end of the belt 7 goes through the buckle 11, then loops around the other end of the side release buckle 10 and back through the buckle 11. The buckles 9 and 11, also seen in FIG. 5, make the belt 7 adjustable to the wearer's own measurements.

Referring to FIG. 3, the camera cradle consists of parts 1, 2, 3, 4A, 5, and 6A. The lens straps 1 and 2 are one to two inches wide and six inches long, and are made of mating hook and eye type material known as Velcro. Lens strap 1 is sewn to the end of strap 3 which is preferably made of nylon webbing one to two inches wide by seven inches long. Lens strap 2 is sewn to the end of Strap 5 which is preferably made of nylon webbing one to two inches wide by seven inches long. Caps and sockets 4A and 6A are preferably heavy duty jacket type snaps which mate to posts and studs 4B and 6B, thus joining the camera cradle to the belt 7. There are several snaps so that they can be snapped in different positions, thus making the camera cradle adjustable to the size of the camera 22.

Figure 8:
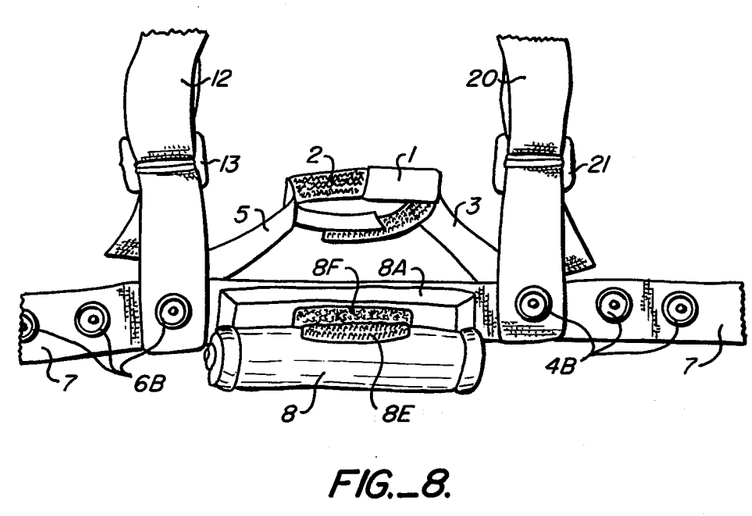
FIG. 8 is a back view of the harness straps and camera cradle areas of FIG. 3 showing the camera cover rolled up.

Referring to FIG. 3, the camera cover 8 is seen rolled up. It is sewn to the back side of the belt 7 in between the harness straps 12 and 20. Referring to FIG. 8, the camera cover 8 is five inches wide by seventeen inches long and can be made of various cloth materials, is preferably sturdy yet flexible, and must be waterproof. One five-inch edge of the camera cover 8 is sewn to the back of the belt 7 in between the harness straps 12 and 20. It is kept in a rolled up position out of the way by the two-inch long Velcro strips 8E and 8F until needed.

Figure 9:
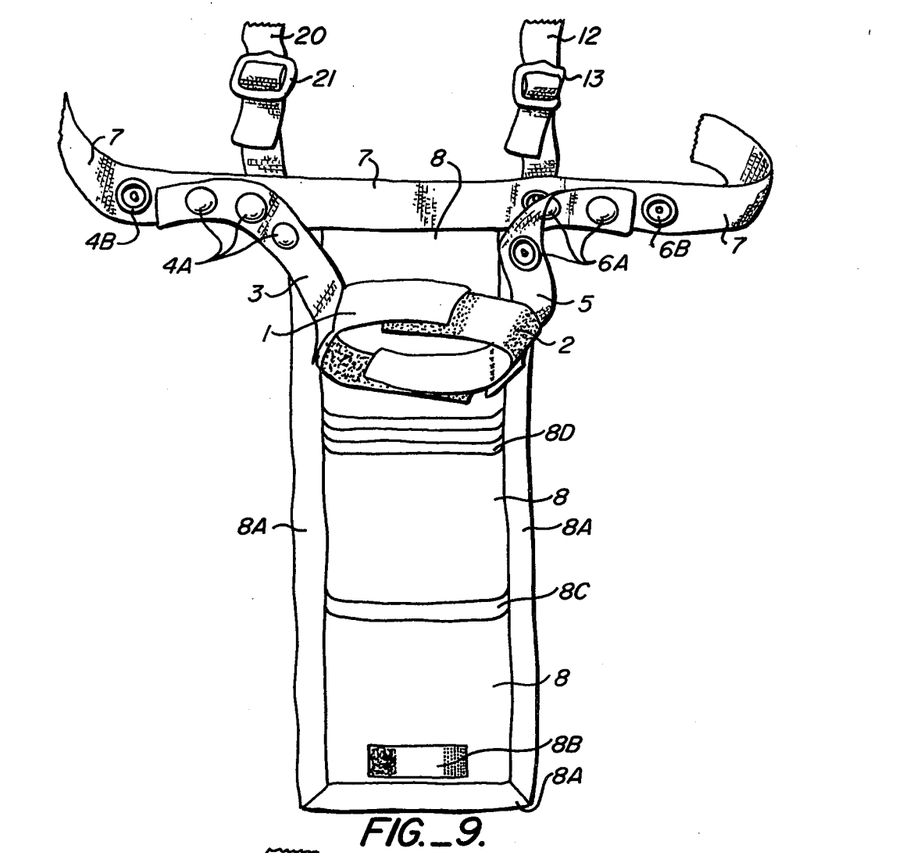
FIG. 9 is a front view of the harness straps and camera cradle areas of FIG. 3 with the camera cover unrolled.
Figure 10:
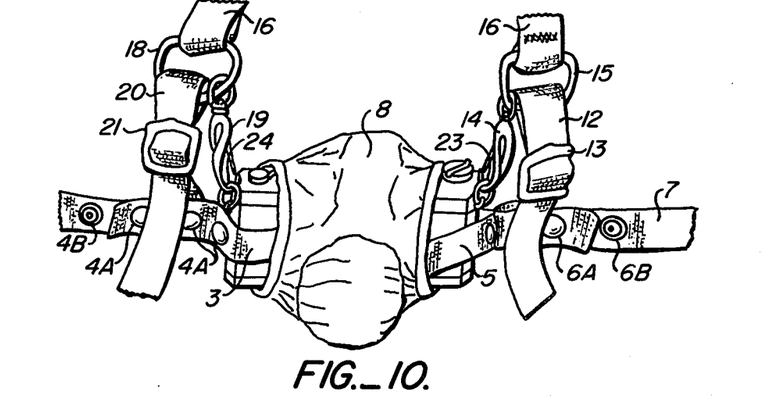
FIG. 10 is a front view of the combination shown in FIG. 7 with the camera cover wrapped around a camera.

The front view of the camera cover 8 can be seen unrolled in FIG. 9. A one-inch wide ribbon trim 8A is sewn around the four sides of 8 to help maintain the integrity of the two pleats 8C and four pleats 8D that expand when stretched around the camera 22 as seen in FIG. 10. A two-inch piece of Velcro 8B is sewn onto the camera cover 8 at the loose end of 8 and fastens to the Velcro strip 8F when wrapped around the camera 22. The camera cover 8 serves a dual purpose of protecting the lens from dirt, rain and the other elements and keeping the camera snug and secure against the body. A wearer could remove the camera cradle 1, 2, 3, 4, and 5 from the harness assembly and then wrap the camera cover 8 around the camera 22 to secure it to the belt 7 and the body of the wearer.

Figure 4:
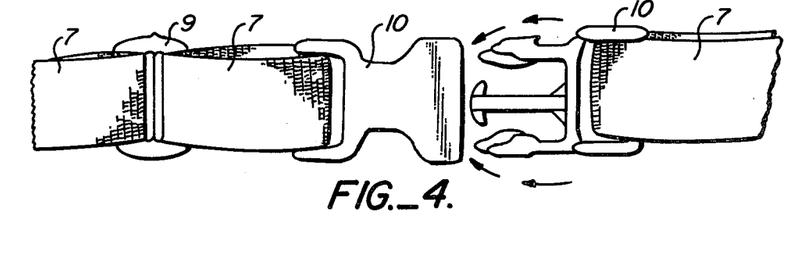
FIG. 4 is a view of the side release buckle used to fasten and unfasten the belt section of the present invention.

FIG. 4 is a view of the side release buckle 10 in open position. It is made of plastic and opens and fastens with ease. When fastened it is extremely sturdy and stays closed unless opened properly. The side release buckle 10 is located on the right side of the wearer's body. Both ends of the belt 7 loop around the buckle 10.

Figure 5:
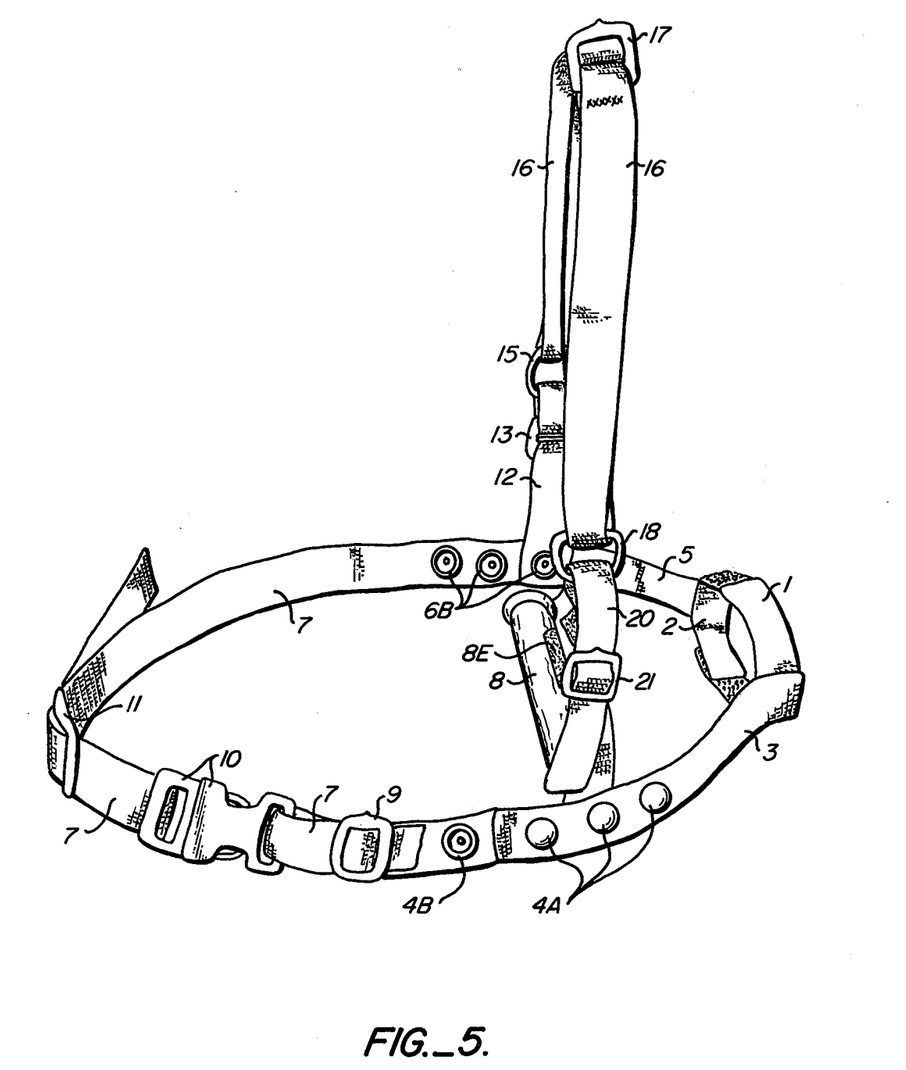
FIG. 5 is a side view of the present invention shown in FIG. 3.

FIG. 5 is a side view of FIG. 3. The camera cradle 1, 2, 3, 4A, 5, and 6A is snapped in place to the belt 7; it stays intact whether the camera is attached or not, as does the entire harness assembly. If desired, the camera cradle can be unsnapped and removed completely. The side release buckle 10 is to the back right side of the harness assembly. The entire assembly is removed from the body by releasing the buckle 10.

Figure 2:
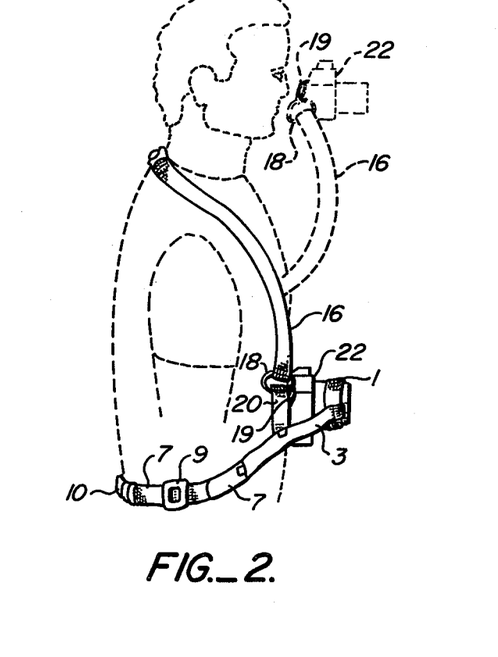
FIG. 2 is a side view of a person wearing the present invention with a camera attached thereto. The solid line drawing shows the carrying position of the camera, the neck strap attached to the harness and the cradle attached to the belt and wrapped around the camera lens. The dotted line shows the eye level position of the camera and neck strap.
Figure 6:
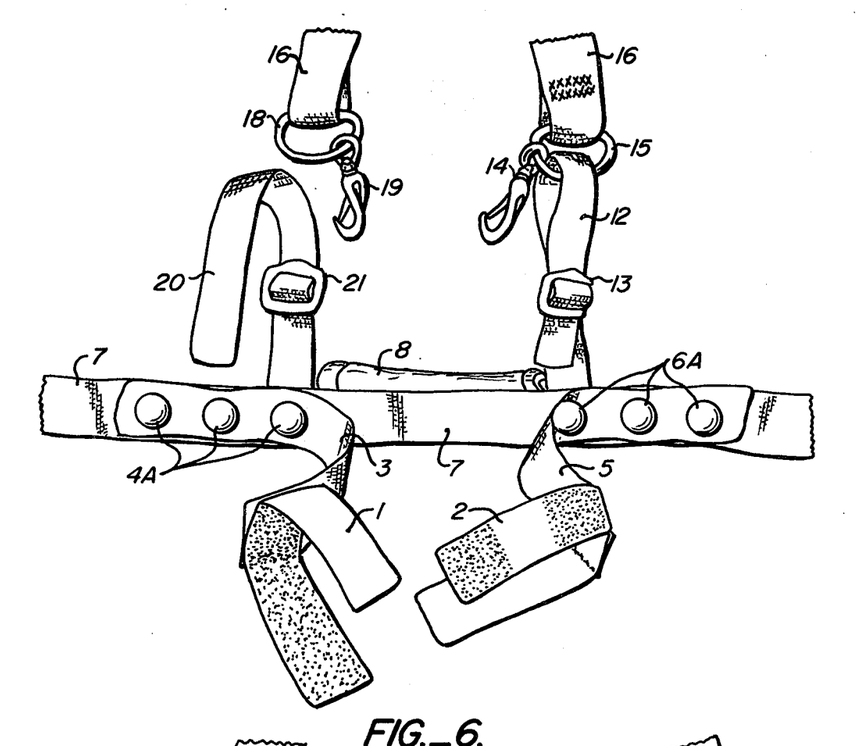
FIG. 6 is a front view of the harness straps and camera cradle areas of FIG. 3.

Referring to FIG. 6, the harness strap 20 has been released from the D ring 18 and the buckle 21. The same can be done with strap 12. It is in this manner that the camera, if attached to the snap hooks 14 and 19, may be lifted to eye level while still attached to the neck strap 16 as seen in FIG. 2. The lens straps 1 and 2 are in an open position, ready to receive the camera 22 and wrap around its lens.

Figure 1:
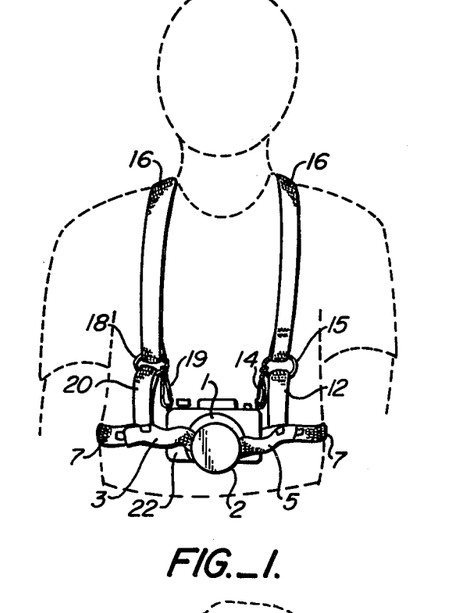
FIG. 1 is a front view of the torso of a person wearing the present invention with a camera attached thereto.
Figure 7:
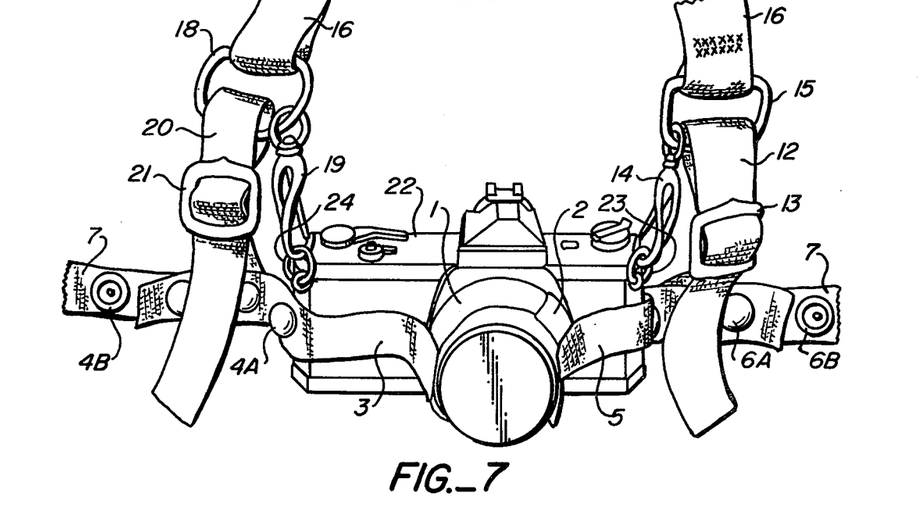
FIG. 7 is a front view of the harness straps and camera cradle areas of FIG. 3 with a camera attached thereto.

Referring to FIG. 7, the round eye swivel snap hooks 14 and 19 are connected to the camera rings 23 and 24 and hold the camera 22 securely. The lens straps 1 and 2 are wrapped around the lens and fastened to each other. The camera 22 is thus secured to the body in this position as seen in FIGS. 1 and 2 by the lens straps 1 and 2 as well as the hooks 14 and 19. To remove the camera 22, the wearer unfastens lens strap 1 from lens strap 2 by pulling them apart, and quickly and easily unhooks the snaphooks 14 and 19. This allows the wearer to conveniently change cameras or film, or store the camera away without the necessity of removing the harness assembly from the wearer. Thus, the wearer continually has the harness in place to receive a camera 22 at any time desired.

Figure 11:
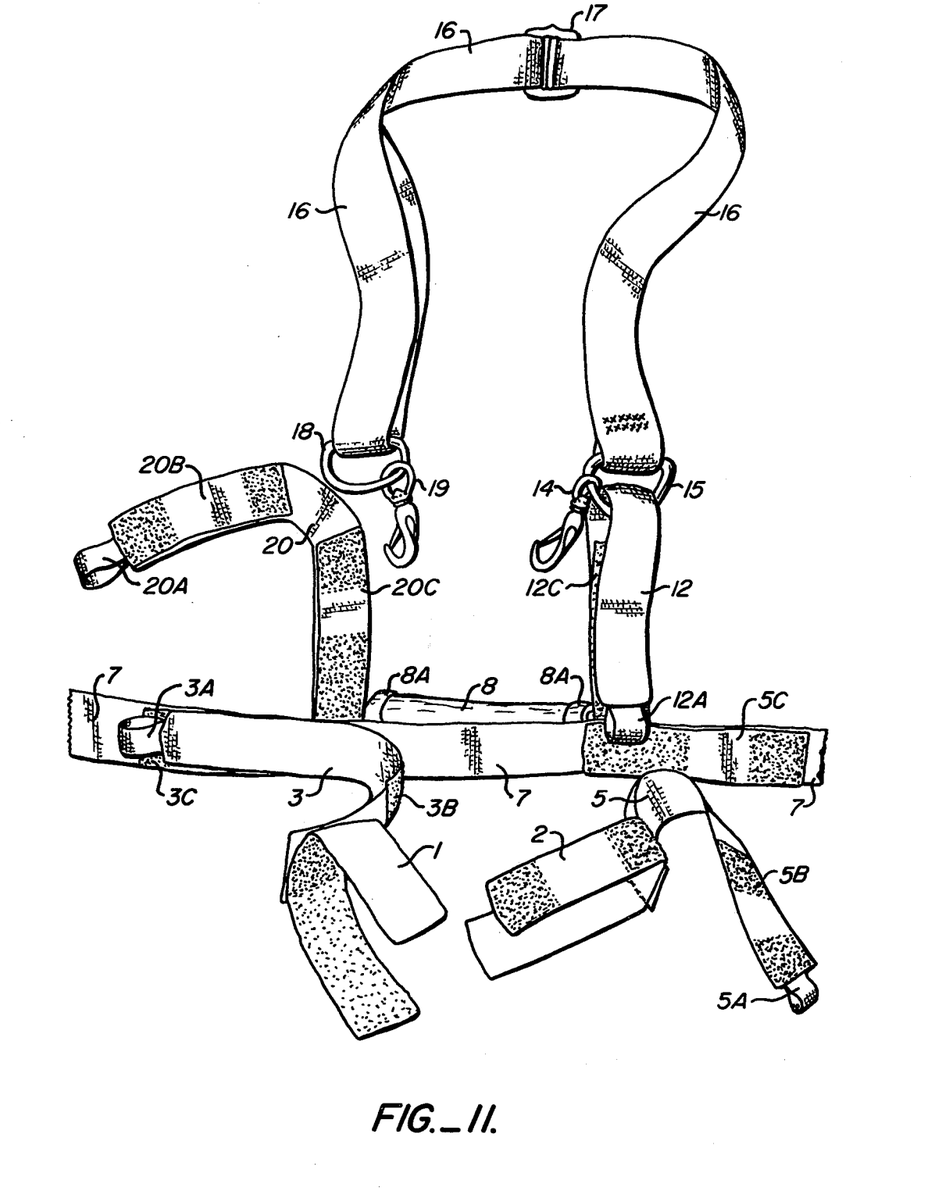
FIG. 11 is a front view of a modified form of the present invention.

Another alternate form of the invention is illustrated in FIGS. 11, 1 and 2. This form of the invention has a three-inch ribbon loop 20A sewn between strap 20 and a three-inch Velcro strip 20B. Velcro strip 20B is sewn onto strap 20. Another three-inch Velcro strip 20C is sewn onto strap 20 nearest the belt 7. Strap 20 goes through D ring 18 and is folded over and fastened by Velcro strips 20B and 20C. Harness strap 12 is assembled and used in identical manner to harness strap 20. The Velcro strips in FIG. 11 seal together and separate quite easily. This eliminates the buckles 13 and 21 shown in FIG. 3. The harness straps 12 and 20 in FIG. 11 can be quickly removed from the D rings 15 and 18 allowing the wearer to quickly raise the camera 22 to eye level as seen in FIG. 2.

Also in FIG. 11 the invention has added three-inch ribbon loops 3A and 5A and four-inch Velcro strips 3B and 5B which are sewn to strips 3 and 5. Strips 3B and 5B attach to four-inch Velcro strips 3C and 5C which are sewn to the belt 7. These Velcro strips adhere well and make it easy to adjust the camera cradle to various sizes of camera 22. The Velcro strips 3B, 3C, 5B, and 5C replace the snaps 4A, 4B, 6A, and 6B as seen in FIGS. 3, 5, 6, 7, 8, 9, and 10. The camera harness assembly as seen in FIGS. 3 and 11 are the same with the exception of Velcro acting as a substitute for snaps 4A, 4B, 6A and 6B and buckles 13 and 21.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claimes as are stated therein.

Having disclosed my invention I desire to claim it as follows:

I claim:

1. A wearer adjustable and camera adjustable camera carrying harness assembly means adapted to releasably position a camera firmly against the abdominal area of the wearer when in a carrying position and permitting selective eye level positioning in an operating position comprising:
    a. said camera having two apertured coupling elements thereon;
    b. a flexible non-elastic length adjustable neck strap with two ends each having a ring and a hook for attachment of the hooks to the said apertured coupling elements of the camera;
    c. a flexible non-elastic length adjustable releasable belt extending around the waist of the wearer;
    d. two flexible non-elastic length adjustable harness straps each having two ends, the first end of each being rigidly and unreleasably connected to the belt and the second end of each being releasably connected to the neck strap;
    e. a flexible non-elastic length adjustable and removable camera cradle which removably and adjustably attaches to the belt by means of cooperating fasteners and which removably and adjustably encircles and secures the camera and camera lens by means of cooperating fasteners;
    f. a flexible non-elastic camera cover rigidly connected to the belt which is rolled up and fastened to itself by means of cooperating fasteners when not in use and which is unrolled and wrapped around the body of the camera and fastened to itself by means of cooperating fasteners when in use.

2. The invention as defined in claim 1 wherein the second ends of the two length adjustable harness straps go through the neck strap rings and adjustably and removably attach to themselves by means of sliding buckles.

3. The invention as defined in claim 1 wherein the two length adjustable harness straps contain Velcro connecting material so that the second ends go through the respective rings at the ends of the neck strap and adjustably and removably attach to themselves by means of mating Velcro connecting material.

4. The invention as defined in claim 1 wherein the length adjustable and removable camera cradle is adjustably and removably attached to the belt by means of mating Velcro connecting material.

5. The invention as defined in claim 1 wherein the length adjustable and removable camera cradle is adjustably and removably attached to the belt by means of mating snap fasteners.

6. The invention as defined in claim 1 wherein the length adjustable and removable camera cradle encircles the camera lens and fastens to itself by means of mating Velcro connecting material.

7. The invention as defined in claim 1 wherein the camera cover fastens to itself by means of mating Velcro connecting material.

8. The invention as defined in claim 1 wherein the neckstrap rings are D-rings.

9. The invention as defined in claim 1 wherein the neckstrap hooks are swivel snaphooks.

* * * * *